(12) United States Patent
Glover et al.

(10) Patent No.: US 8,839,272 B2
(45) Date of Patent: Sep. 16, 2014

(54) METHOD AND SYSTEM FOR THE SUPPORT OF APPLICATION SPECIFIC POLICIES FOR CONVENTIONAL OPERATING SYSTEMS

(75) Inventors: Frederick S. Glover, Hollis, NH (US);
Diane Lebel, Methuen, MA (US);
Thomas J. Engle, Nashua, NH (US);
Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 113 days.

(21) Appl. No.: 13/450,396

(22) Filed: Apr. 18, 2012

(65) Prior Publication Data

US 2013/0283295 A1    Oct. 24, 2013

(51) Int. Cl.
*G06F 3/00*       (2006.01)
*G06F 9/44*       (2006.01)

(52) U.S. Cl.
USPC ........................................... 719/318; 717/127

(58) Field of Classification Search
None
See application file for complete search history.

(56) References Cited

U.S. PATENT DOCUMENTS

| | | | |
|---|---|---|---|
| 2006/0174229 A1* | 8/2006 | Muser | 717/128 |
| 2006/0230391 A1* | 10/2006 | Alexander et al. | 717/130 |
| 2008/0320496 A1* | 12/2008 | Barinov et al. | 719/318 |
| 2009/0265780 A1* | 10/2009 | Korkus et al. | 726/22 |
| 2010/0042977 A1* | 2/2010 | Chinchalkar et al. | 717/128 |
| 2013/0159977 A1* | 6/2013 | Crosetto et al. | 717/128 |

OTHER PUBLICATIONS

"Tunning High Performance Kernels through Empirical Compilation", Whaley, 2005, pp. 1-10.*
"IBM AIX Version 7.1 Differences Guide", IBM, 2010, pp. 1-454.*

* cited by examiner

*Primary Examiner* — Tuan Dao
(74) *Attorney, Agent, or Firm* — Hickman Palermo Truong Becker Bingham Wong LLP; Justin R. Baratz

(57) ABSTRACT

The approaches described herein provide support for application specific policies for conventional operating systems. In an embodiment, a kernel module representing a kernel subsystem is executed within an operating system's kernel. The kernel subsystem may be configured to respond to particular requests with one or more default actions. Additionally, the kernel subsystem may define a number of sub-modules which represent application specific policies that deviate from the default actions. Each sub-module may define one or more sets of conditions which indicate when the sub-module is applicable to a request and one or more sets of corresponding actions to take when the conditions are met. When an application sends a request to the kernel subsystem, the kernel subsystem determines whether the request meets the conditions of a particular sub-module. If the particular sub-module's conditions are met, the kernel subsystem performs the corresponding actions of the particular sub-module.

24 Claims, 4 Drawing Sheets

METHOD AND SYSTEM FOR THE SUPPORT OF APPLICATION SPECIFIC POLICIES FOR CONVENTIONAL OPERATING SYSTEMS

FIELD OF THE INVENTION

The techniques presented herein are directed towards support of application specific policies for conventional operating systems.

BACKGROUND

An operating system (OS) is a set of programs that manage computer hardware resources and provide common services for application software. In many cases, developers of operating systems will organize the various management and service functions that the operating system provides into a set of components. These components may cover aspects of the operating system such as networking, security, and the user interface.

One component, referred to as the kernel, is generally considered the main component of the operating system and acts as a bridge between the applications and the data processing performed at the hardware level. The kernel's basic functions typically include process management, memory management, device management, and system calls. The kernel may also be compartmentalized into several subsystems, each of which controlling a different functionality. For example, one subsystem may implement a virtual file system and another subsystem may implement the kernel's scheduler.

A conventional computer operating system typically segregates virtual memory into kernel space and user space. Kernel space is reserved for running the kernel and user space is the memory area where all user mode applications work.

In order to protect the operation of the kernel, many central processing unit (CPU) architectures implement modes which can place restrictions on the type and scope of operations performed by certain processes being run by the CPU. Typically, a CPU will support at least two modes. Kernel mode, also known as supervisor mode, has unrestricted access to the computer's resources. For example, in kernel mode the CPU may perform any operation allowed by its architecture, execute any instruction, initiate any I/O operation, and access any area of memory. By contrast, user mode is restricted and certain instructions are not permitted. For example, an application running in user mode may be restricted from accessing memory locations in kernel space.

In some implementations, an application running in user mode gains access to resources reserved to the kernel by making a system call which requests a service provided by the kernel. This system call causes the CPU to switch from user mode to kernel mode and invokes the kernel which then performs the requested service on behalf of the application. Typically, system calls are implemented by a software interrupt that transfers control to the kernel. As a result, an application making a system call sets a register with an identifier unique to the particular system call being made and triggers the interrupt. Once control is transferred to the kernel, the kernel looks up the identifier in a table, known as a system call table, to locate the memory address of the code that that will be executed to perform the system call's service. In addition, in order to pass parameters for the system call, the application sets other registers with memory addresses specifying the location of the parameters, which will often times reference the application's own call stack.

Due to the power that kernel mode possesses, great care is taken in selecting the code allowed to run within the kernel. Malicious code which finds its way into the kernel can often times be difficult to detect and can cause undesirable results ranging from a system crash to an attacker taking control of the system. Typically, users and administrators only run code within the kernel that comes from a trusted source, such as the developer or owner of the particular subsystem that the code is intended to implement, extend, or modify.

Balanced against the danger of introducing code into the kernel is the desire to add functionality to the kernel which may not have existed at the time the kernel was originally loaded into the system.

In some cases, an application may require metrics regarding a subsystem's performance of the application's tasks. User space tools can be used to collect a fairly wide range of application level metrics using existing OS provided library and system calls. However, customized application specific views into operating system information are generally not available. For example, conventional OS IO metric collection APIs do not offer access to fine grained characterizations of the IO access patterns of a specific application or application group of processes nor the ability to direct the collection of the metrics.

Furthermore, in other cases, an application may require content management information from the subsystem. For example, an application may be interested in monitoring changes made by itself or other applications to a particular set of files. However, customized application specific reports into the modification history of files are generally not available from a conventional OS.

More often than not, the applications which require the customized functionality do not come from a trusted source such as those previously mentioned. As such, applications are typically not allowed to load code into the kernel to create the extended functionality. Furthermore, even if the applications were trusted, without support from the kernel subsystem no interface would exist to allow the application to communicate to the subsystem when and how the new functionality should be applied. Therefore, support of application specific policies for conventional operating systems remains an ongoing problem.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompany drawings and in which like reference numerals refer to similar elements and in which.

DETAILED DESCRIPTION

Figure 1:
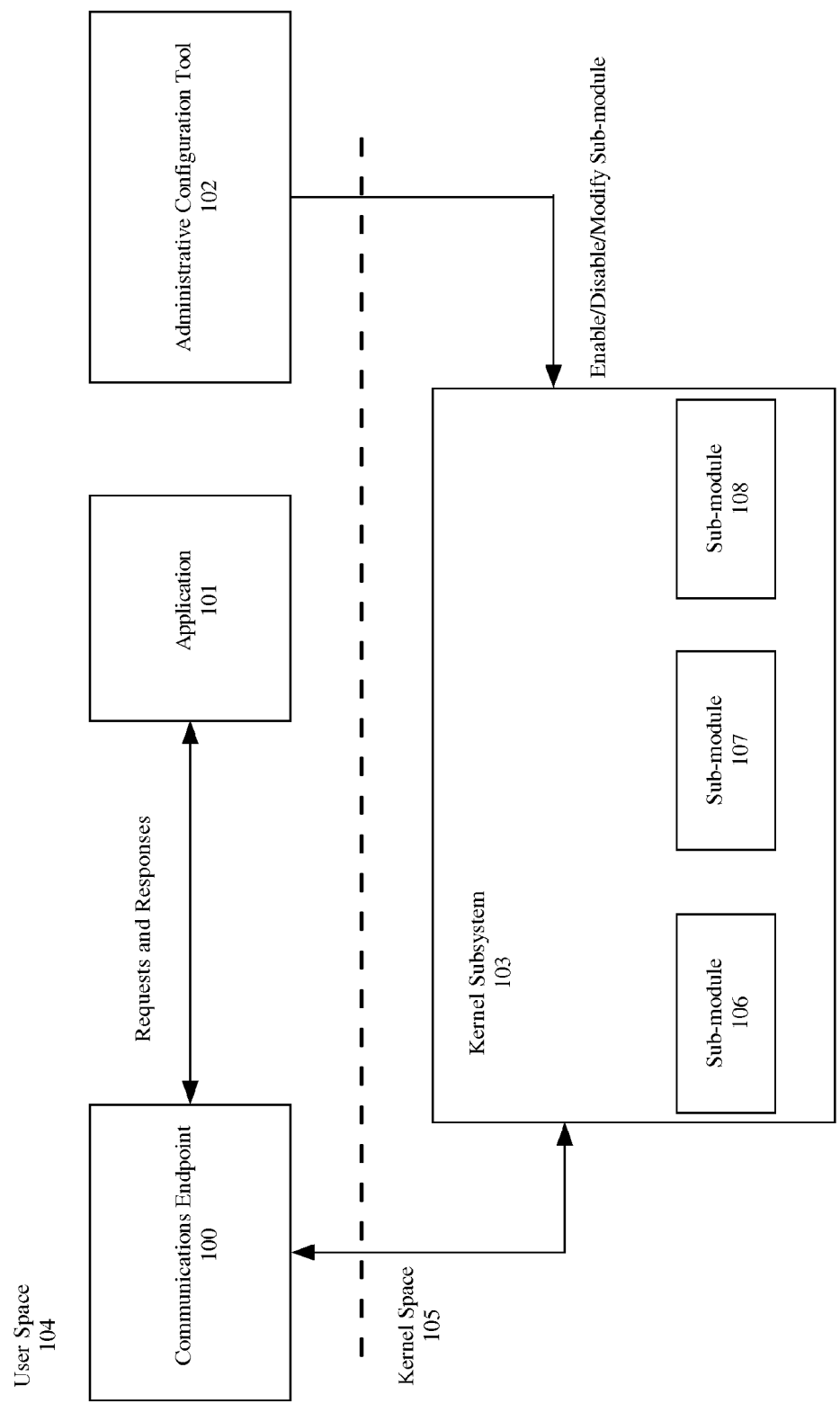
FIG. 1 is a block diagram that illustrates an embodiment of an operating system design which can support application specific policies.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In some embodiments, the kernel subsystem may provide support for a particular set of requests. For example, a kernel subsystem that implements a virtual file system may handle requests to read or write to files on the virtual file system.

In an embodiment, the kernel subsystem may handle each type of request the same way regardless of the circumstances of the request. For example, in the case of a request to write to a file, the kernel subsystem may provide a response that simply performs the write without collecting any kind of extra information. This type of response does not depend upon the circumstances of the request such as the specific application making the request or the targets of the request. Thus, the same response may be applied generally to satisfy the requests of a multitude of different applications. In some cases, such a response may be considered a "default action" of the kernel subsystem.

However, there are times when, under certain circumstances, an application may require requests to be handled in a way that deviates from the default actions.

For example, a kernel subsystem's default actions may collect metrics related to file access frequency, but without keeping track of the particular applications which have been accessing the files. As such, the kernel subsystem may only be able to provide general metrics related to the overall access frequency of the files. If an application requires a more specialized metric, such as its own access frequency, the kernel subsystem may not be able to provide that information.

In order to support such specialized metrics the kernel subsystem may require the ability to recognize when a particular application is making a request and perform an action that is tailored to that particular application. For example, the kernel subsystem may keep track of a separate file access frequency that only considers accesses made by the particular application.

As another example, an application may need to monitor a specific set of files and collect content management information such as how the files change over time and/or which applications initiated those changes. However, a kernel subsystem may satisfy write requests with a default action that does not keep track of a change log containing the pertinent information. Therefore, again, the default actions of the kernel subsystem may be inadequate to provide the information required by the application.

In order to support customized content management information, the kernel subsystem may require the ability to recognize when certain files have been made the target of an application's request and perform an action tailored to that circumstance. For example, the kernel subsystem may update a change log to indicate the file being changed, the byte range being modified, the content of the change and/or the application initiating the change. The application may then, upon receiving the collected information, perform analysis and take appropriate actions such as applying a specific tag to the file.

In some embodiments, a kernel subsystem may define sub-modules which represent policies that dictate how to handle requests depending on the circumstances. The sub-modules may define one or more sets of conditions which inform the kernel subsystem when the sub-module should be applied. Additionally, the sub-modules may define one or more sets of actions to take when that sub-module's conditions have been met. As such, the actions of a sub-module may take the place of or augment the kernel subsystem's default actions when the sub-module's conditions have been met. "Augmenting", in this case, means performing the sub-module's actions in addition to the default actions. In other embodiments, sub-modules may also provide support for entirely new requests which have no corresponding default actions.

Thus, in an embodiment, a kernel module representing a kernel subsystem is executed within an operating system's kernel. The kernel subsystem may be configured to respond to particular requests with one or more default actions. Additionally, the kernel subsystem may define a number of sub-modules which represent application specific policies that deviate from the default actions. Each sub-module may define one or more sets of conditions which indicate when the sub-module is applicable to a request and one or more sets of corresponding actions to take when the conditions are met. When an application sends a request to the kernel subsystem, the kernel subsystem determines whether the request meets the conditions of a particular sub-module. If the particular sub-module's conditions are met, the kernel subsystem performs the corresponding actions of the particular sub-module.

Structural Overview

FIG. 1 is a block diagram that illustrates an embodiment of an operating system design which can support application specific policies.

Kernel subsystem 103 may represent any number of sub-systems including, but not limited to, a virtual file system, a scheduler, or a device driver. Kernel subsystem 103 contains a number of sub-modules such as sub-modules 106, 107, and 108. In addition, kernel subsystem 103 is in communication with a number of user space 104 entities such as application 101 and administrative configuration tool 102. Messages between kernel subsystem 103 and user space entities such as application 101 may take place through an intermediary such as communications endpoint 100. While only communications endpoint 100 between application 101 and kernel subsystem 103 is depicted, any user space entity including administrative configuration tool 102 may make use of a communication endpoint. In addition, while only a specific number of kernel subsystems, sub-modules, applications, administrative configuration tools and communication endpoints have been illustrated for the sake of convenience, an embodiment may in fact contain any number of these entities.

Figure 2:
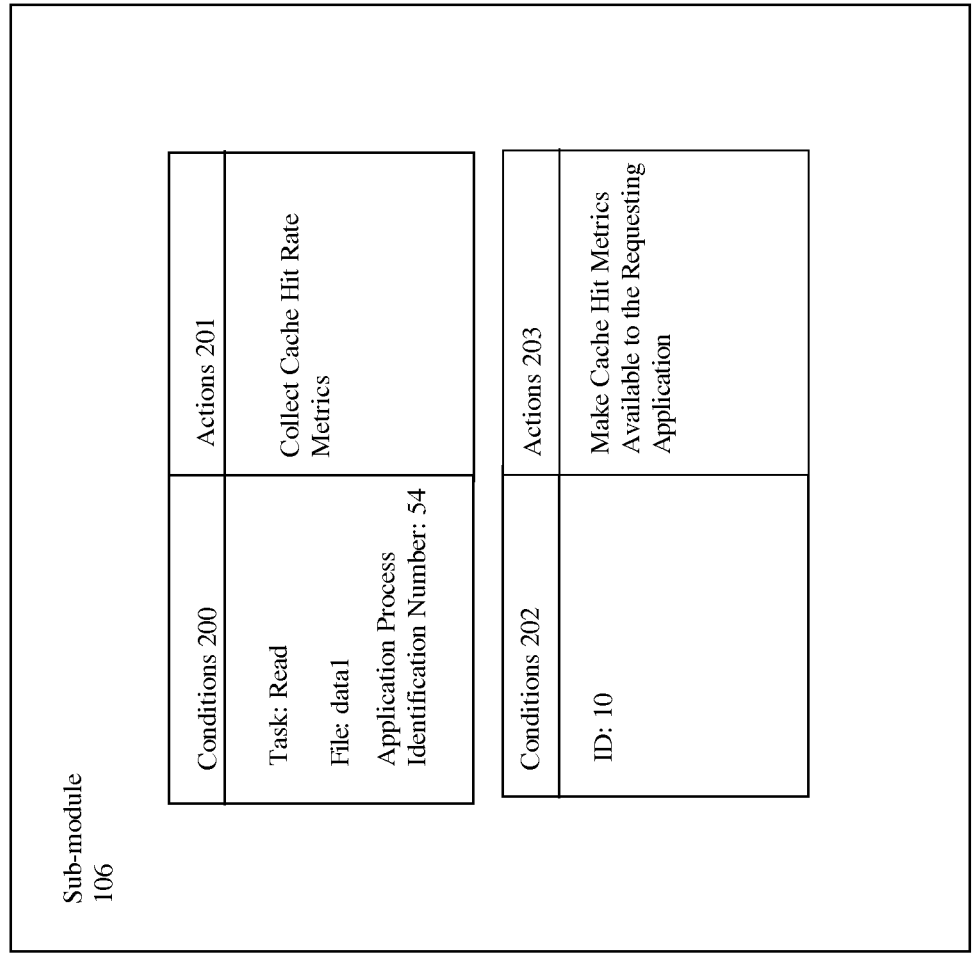
FIG. 2 is an example of a sub-module which defines the conditions and actions constituting an application specific policy.

FIG. 2 is an example of a sub-module which defines the conditions and actions constituting an application specific policy.

Sub-module 106 defines sets of conditions 200 and 202 as well as corresponding actions 201 and 203 to take if those conditions are met. Note that while sub-module 106 depicts only two sets of conditions, a sub-module may in fact define any number of sets of conditions. Furthermore, while only one action is defined by sub-module 106 for each set of conditions, a sub-module may in fact define multiple actions for each set of conditions.

Functional Overview

Loading the Kernel Subsystem

Figure 3:
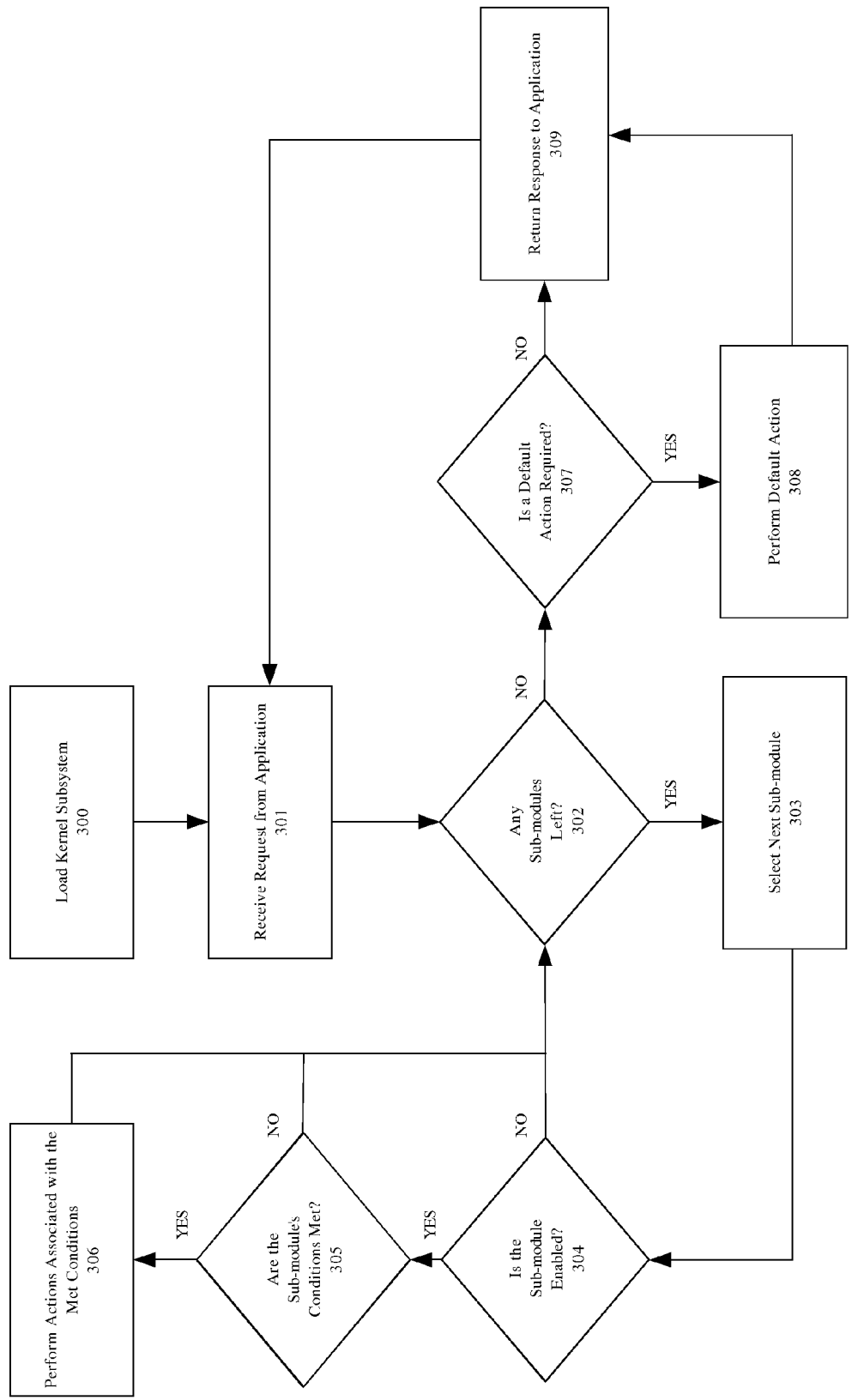
FIG. 3 is a flow diagram showing an embodiment kernel subsystem handling a request from an application.

FIG. 3 is a flow diagram showing an embodiment kernel subsystem handling a request from an application.

At block 300 the kernel subsystem is loaded into the kernel. In an embodiment, the kernel subsystem may be loaded into the kernel by means of an update requiring the entire kernel to be rebuilt and rebooted. However, other embodiments may make use of tools such as Loadable Kernel Modules (LKMs) to alleviate the need to rebuild or reboot the kernel. LKMs are typically object files that contain code to extend the running kernel, also referred to as the base kernel, of an operating system. One example of how LKMs can be implemented and used is described by a document authored by Peter Jay Salzman entitled "The Linux Kernel Module Programming Guide," 2007, the entire contents of which is incorporated by reference for all purposes as if fully set forth herein. While this reference only describes LKMs with regard to the Linux operating system, many operating systems provide similar functionality under slightly different names such as kernel loadable modules for FreeBDS and kernel extensions for Mac OS X. As a few additional examples, Windows, AIX, and Solaris also provide support for LKMs. LKMs and other modules that extend the base kernel will be referred to as kernel extension modules.

Application Requests

At block 301 the kernel subsystem receives a request from an application. In an embodiment, once the kernel subsystem is loaded, applications can begin to send requests to the kernel subsystem to perform tasks on the application's behalf. For example, if the kernel subsystem is a virtual file system an application may make a system call that sends a request to write to a particular file. While a system call is used in this example, any inter-process communication mechanism which is capable of sending a message from an application to a kernel subsystem may be employed such as interrupts and call gates.

In some embodiments, the messages sent by the application may be handled by an intermediary between the kernel subsystem and the application such as a communication endpoint. In some cases, a communication endpoint may define an interface for sending messages back and forth between user-space to kernel-space. As such, the application and the kernel subsystem may be insulated from the implementation details of the context switch between user mode and kernel mode. In addition, if multiple kernel subsystems are running concurrently, a communication endpoint might ensure that the correct kernel subsystem receives a given message.

Sub-Module Selection

At block 302 the kernel subsystem determines whether any sub-modules have yet to be considered. In some embodiments, after the kernel subsystem receives a request from an application, the kernel subsystem determines whether the request meets the conditions of an enabled sub-module. As such, the kernel subsystem may check each sub-module that the kernel subsystem possesses in order to determine if any applicable sub-modules exist. However, other embodiments may check only a subset of the sub-modules. For example, metadata may be stored by the kernel subsystem indicating that certain sub-modules are only applicable to certain requests. When a request is received, the metadata may be used to limit the sub-modules that are to be considered.

If the kernel subsystem determines that there are sub-modules that still need consideration, the kernel subsystem chooses a sub-module at block 303. In some embodiments, the kernel subsystem may check the sub-modules serially. For example, the kernel subsystem may keep track of a list of all sub-modules that the kernel subsystem possesses. The kernel subsystem may then progress through that list, selecting sub-modules in the order that they appear. However, the exact order in which the sub-modules are selected is not critical and data structures other than a list can also be employed. In still further embodiments, sub-modules may be considered in parallel through techniques such as multi-processing. In such embodiments, more than one sub-module may be selected at block 303 depending on the degree of parallelism.

Enabled and Disabled Sub-Modules

At block 304 the kernel subsystem checks whether the sub-module is enabled. In an embodiment, once the kernel subsystem is loaded, the sub-modules of that kernel subsystem begin as disabled by default. When disabled the sub-module's code may be inactive. As such, the conditions defined by a disabled sub-module may be ignored by the kernel subsystem. However, in other embodiments, the kernel subsystem may set all or a subset of its sub-modules to enabled by default.

In order to enable a disabled sub-module, an administrative configuration tool is employed to send a command that informs the kernel subsystem to enable the sub-module. In some embodiments, the administrative configuration tool provides a command line or graphical user interface that allows the user to specify the one or more sub-modules to be enabled. Alternatively, the administrative configuration tool may be used by an application to enable a disabled sub-module through use of an interface such as an application programming interface (API). The administrative configuration tool may also be used to disable one or more enabled sub-modules using the same techniques.

The administrative configuration tool has thus far been described and depicted as communicating directly with the kernel subsystem. However, in some embodiments the administrative configuration tool may communicate with the kernel subsystem indirectly through an intermediary such as a communication endpoint.

If the sub-module is disabled, the kernel subsystem may return to block 302.

Conditions

If the sub-module is enabled, the kernel subsystem checks whether the conditions defined by the enabled sub-module are met at block 305. The conditions defined by the sub-modules of a kernel subsystem may relate to the function of that kernel subsystem. For example, a kernel subsystem which represents a virtual file system may be suited to collecting metrics related to file access patterns. If an application requires a metric such as how often it receives cache hits when accessing a particular file, the sub-module may define a set of conditions identifying the application, the particular file and the task to be performed on the file. FIG. 2 illustrates such a case where sub-module 106 defines set of conditions 200 which is met when an application process with process identification number 54 sends a request to read file data1.

The previous example identifies an application by a single process identification number, but that may not always be the case. An application may be implemented as multiple processes, each of which potentially generating IO for multiple storage targets that are important to the IO analysis of a given application's process group. As such, an embodiment may define a sub-module with a condition that is met when the process making the request belongs to a particular application's process group.

In another embodiment, a sub-module may define a condition that specifies a group of related or unrelated processes that are of interest to the policy implemented by the sub-module. Unrelated processes are processes that do not share a family relationship, such as a common parent process. This group of related or unrelated processes may be considered an application group. In some embodiments, application groups can be created, modified, or removed by a user through the administrative configuration tool. In an embodiment, the condition identifies each process in the application group. In another embodiment, the condition is satisfied when the requesting process is a member of the application group.

In an embodiment, an application may require content management information related to a specific set of files. As a result, a sub-module may define a condition that specifies the files that are to be monitored. In such an embodiment, the condition may be satisfied when a request targets one or more of those files. In another embodiment, the application may only be interested in certain types of requests that target the files. For example, the application may only be interested in requests that will modify the files, such as a write request. In an embodiment, the sub-module also defines a condition that specifies the request type.

In some embodiments, sub-modules may define conditions which relate to attributes of the request such as which application the request came from, what files the request would access, or what devices the request would utilize. One example of when a sub-module may define such conditions is when the sub-module implements a policy that monitors those applications, files, or devices. As another example, a set of actions within a sub-module may be keyed to a specific application or group of applications. Thus, in order to limit those actions to the specific application or application group, the conditions that correspond to those actions may identify the applications privileged to trigger those actions. As a result, the conditions may only be satisfied when a request is received from one of the privileged applications. In an embodiment, this type of restriction may be tied to actions that return information. As a result, ensuring that the information is sent only to the applications privileged to receive the information.

In other embodiments, sub-modules may define conditions which check for special identifiers contained within the request. For example, an application may use a generic input/output control system call to send a request containing a particular identifier to the kernel subsystem. FIG. 2 illustrates such a case where sub-module 106 defines set of conditions 202 which checks whether a system call sent a message with identifier "10". In some embodiments, identifiers located within messages may indicate that the application is making a request that is specific to the functionality provided by a particular sub-module. As such, in an embodiment, the kernel subsystem may not define any default actions which can satisfy that request.

Additionally, a sub-module may define conditions relating to attributes of the file or device that the request will act upon. For example, an application may require metrics relating to a set of files tagged with an identifier such as a particular string. A sub-module may then define conditions which are met when I/O occurs on files which contain that identifier.

In some cases, the conditions that a sub-module defines may require modification. The administrative configuration tool, in some embodiments, may provide an interface which allows a user or application to add, modify, or delete conditions defined by a given sub-module. For example, a user may employ the administrative configuration tool to modify the conditions of sub-module 106 to collect cache hit metrics when an application process with process identification number 54 reads file data2 instead of data1.

The conditions described by way of example in this section are not exclusive. A sub-module may in fact define numerous different types and combinations of conditions which, for the sake of brevity, have not been explicitly described. As such, the conditions of a sub-module should not be interpreted as limited to the examples provided above.

If the conditions of the enabled sub-module are not met the kernel subsystem may return to block 302.

Sub-Module Actions

If the conditions of the enabled sub-module are met the kernel subsystem performs the corresponding actions defined by the enabled sub-module at block 306. In some embodiments, the actions defined by a sub-module are implemented by code which is executed by the kernel subsystem when the corresponding conditions are met.

Referring back to FIG. 2, sub-module 106 defines set of conditions 200 which is met when an application process with process identification number 54 reads file data1. Once the kernel subsystem receives a request which satisfies that condition, the code implementing the corresponding action is executed. In this case, the executed code collects cache hit rates experienced when the kernel subsystem services the request to read file data1.

Although the collection of cache hit metrics is used for the purposes of illustration in the embodiment of FIG. 2, sub-module actions in different embodiments may collect other information such as different metrics and/or content management information. A few non-limiting examples of other metrics that may be collected are access patterns related to specific files or devices, the speed with which the kernel subsystem performs certain tasks, and measurements of how much time the kernel subsystem devotes to the requests of certain applications. Furthermore, content management information that a sub-module may collect in response to a request to write to a file can include a change log indicating the file being changed, the byte range being modified, the content of the change and/or the application initiating the change.

Sub-module 106 defines set of conditions 202 which is met when an application makes a system call with the identifier "10". Once the kernel subsystem receives such a request, the kernel subsystem executes code which makes the collected metric data available to the application which sent the request.

In some embodiments, the code that returns collected information to an application may make the information available by sending a message to the application. In other embodiments, rather than sending the message itself, the code may compile the information into a message and rely on the default actions of the kernel subsystem to perform additional steps needed to deliver the message.

In an embodiment, a request may contain information in addition to the identifier, such as information indicating how the application wants the collected information to be formatted. For example, in the case where a sub-module defines actions that collect more than one type of metric, the additional information may specify which metrics are to be returned. In another embodiment, the formatting may be associated with settings associated with the sub-module. In such embodiments, the settings may be modified by employing the administrative configuration tool.

In an embodiment, a sub-module may define more than one set of actions. For example, in the case of metric collection, each set of actions may collect a different type of metric. In such embodiments, the administrative configuration tool may be employed to enable or disable sets of actions within a sub-module. In this fashion, if a sub-module defines a policy that performs sets of actions which are not needed at the moment, those actions can be suspended to save on overhead costs.

In some embodiments, the sub-module may cause the kernel subsystem to send a response containing the collected information to an application without waiting for a request from an application. For example, the sub-module may cause the kernel subsystem to push the collected information to the application at periodic intervals once the sub-module is enabled. As a result, the conditions associated with the actions of pushing the collected information may relate to the periodic interval and check whether that interval has elapsed. Since in these embodiments the conditions are timer based, rather than request based, the process of checking whether the interval has elapsed may occur outside the flow diagram depicted by FIG. 3. For example, the checking may be performed by a background process. In an embodiment, the frequency with which the collected information is pushed and/or an indication of the application that the information is to receive the information may be stored as a setting capable of being modified through the administrative configuration tool.

In some embodiments, once the sub-module's actions have been performed, the kernel subsystem returns to block 302, to check whether the request has satisfied the conditions of other sub-modules. However, other embodiments may only allow one sub-module to perform actions for each request. In such embodiments, the kernel subsystem may skip block 302 and proceed directly to block 307.

Kernel Subsystem Default Actions

At block 307, the kernel subsystem determines if any default actions are required.

In some embodiments, the kernel subsystem defines a number of default actions. The default actions may be actions which are taken when the request does not meet the conditions of any enabled sub-module.

For example, if an application makes a request to a write to a file, the request may not satisfy the conditions of any enabled sub-module. Thus, there may be no specific policy in effect which applies to the request. However, the application may still need the substantive work of writing to the file completed. As such, the kernel subsystem may define default actions which apply generally to requests of a certain type and at least performs the substantive work required to satisfy the request. In this case, the kernel subsystem may execute code which performs the default action of writing to the file. In an embodiment, the default actions may still collect information such as metrics or content management information, however the information collection may not be as fine grained as the policies defined by the sub-modules.

In some embodiments, a default action may be defined for each type of request that an application can send to the kernel subsystem. However, other embodiments may define a default action for some types of requests but not others. If a request is received for which no default action is defined, the kernel subsystem may send an error message back to the application informing the application that the request cannot be satisfied. For example, a sub-module such as the one depicted in FIG. 2 may define a policy that collects application specific metrics and supports a system call representing a new type of request that returns the collected metrics. If an application uses the system call while the sub-module is disabled, the kernel subsystem may not have a default action which can satisfy that request. As such, the kernel subsystem may return an error message to the application.

In other embodiments, the kernel subsystem may perform the default action regardless of whether the application's request met the conditions of an enabled sub-module. For example, the default actions may perform the substantive work needed to satisfy the request and the sub-module actions may perform work which is beyond the scope of the request, such as collecting metrics. In such an embodiment, block 307 may be skipped and the kernel subsystem may proceed directly to block 308. Alternatively, in another embodiment, the default actions may be performed before the sub-module actions, and the metrics collected by the sub-module actions may relate to the substantive work performed to satisfy the request (i.e. the default actions).

In still other embodiments, the previous approaches may be mixed. In such embodiments, some sub-modules may define actions which replace the default actions and other sub-modules may define actions which augment the default actions. As such, the sub-module may provide a flag or some other indication that the default action is to be replaced rather than augmented. If the flag is encountered, the kernel subsystem may determine that no default action is required.

If a default action is determined to be required at block 307, the default action is performed at block 308 and the kernel subsystem proceeds to block 309. If a default action is determined to not be required, the kernel subsystem may proceed directly to block 309.

Response to the Application

At block 309 the kernel subsystem returns a response to the application.

In some embodiments, the kernel subsystem sends the response by leaving the message in a user space memory location where the application can access the response. However, in other embodiments, the kernel subsystem may make use of an intermediary, such as a communications endpoint, to send the response to the requesting application. The exact mechanism that the kernel subsystem uses to return a response is not critical. As such, the kernel subsystem may employ any number of different kinds of inter-process communication mechanisms to return a response to the requesting application.

In an embodiment, the response will indicate whether or not the request was successfully handled. For example, if an application made a request to write to a file, the response may indicate success by returning how many bytes had been written. If the request was not handled successfully, the response may contain an error message indicating why the request could not be fulfilled.

In another embodiment, the response may contain information such as content management updates or metrics which have been requested by the application. In some embodiments, the metrics may have been formatted into a message by the actions of a sub-module at block 306. As such, the kernel sub-module may return that message to the application at block 309. However, in other embodiments, the actions at block 306 may simply identify the metrics and rely on block 308 or 309 to format the metrics into a message that can be provided to the application.

Alternatives

The flow diagram of FIG. 3 depicts only one potential embodiment. In some embodiments the blocks may be ordered differently than they are currently depicted. In addition, some embodiments may combine, divide, remove, or add blocks compared to the flow diagram depicted in FIG. 3. For example, an embodiment may check the conditions of a sub-module at the same time or before checking whether the sub-module is enabled. Also, an embodiment may determine whether a default action is required before determining whether an enabled sub-module applies to the request. Consequently, such an embodiment may perform the default actions prior to performing the sub-module's actions.

Furthermore, in some embodiments, the interplay between sub-module actions and default actions may follow a call and return model rather than one being performed before or after the other as depicted in FIG. 3. For example, the code implementing the sub-module actions may call the code implementing the default actions rather than the kernel subsystem performing an explicit determination at block 307. As another example, the code implementing the default actions may call a function of the kernel subsystem that determines if an applicable sub-module should be applied before returning to the default action's code. As a result, depending on the embodiment, the sub-module's actions may be called during the execution of the default actions and vice versa.

Additional Examples

As discussed above, sub-modules may be defined to implement policies that collect file I/O metrics and content management information. However, sub-modules are not limited to those uses and may in fact implement many different types of features. The following will serve as a few additional non-limiting examples of policies that can be defined by sub-modules.

In an embodiment, a sub-module may be defined to create an access control policy for IO operations. When this sub-module is enabled, requests that perform IO operations (open, close, read, write, etc) trigger the sub-module's actions which perform an additional access check. Each OS user (subject) and file (object) is given an additional enhanced set of security attributes (mandatory access control security label) beyond the traditional OS file access security model of users and user groups. These labels may include attributes specifying non-classified, secret, and top secret access. Whenever a subject attempts to access an object, an additional authorization rule enforced by the sub-module examines the enhanced subject and object security attributes and decides whether the access can take place. In some embodiments, any operation by any subject on any object will be tested against the sub-module's rule set to determine if the operation is allowed. In other embodiments, the sub-module may define conditions that only trigger the additional security check when the request targets a specific object, is performed on behalf of a particular user, and/or requires a particular IO operation to be performed.

In an embodiment, a sub-module may be defined to create limits on the operations users can perform on specific files. For example, the sub-module's policy may allow all users to have access to update a particular file. However, the sub-module may constrain the operations that can be performed during the update to only allow extension updates to the file and deny updates to existing data blocks of the file. In some embodiments, such a policy may be used in support of an Information Lifecycle Management (ILM) system that preserves the original state of all files through implementation of an "append mode only" file update model. In an embodiment, the sub-module may define conditions that trigger the limitation for all users or only a particular set of users. In another embodiment, the sub-module may define a condition that only triggers the limitation during select time intervals, such as updates occurring between 11:00 pm and 6:00 a.m.

In an embodiment, a sub-module may define a policy that collects file usage data. When this sub-module is enabled, each IO operation is recorded with the operation type, file ID, user, and time of access. An application can subsequently request this information from the sub-module and generate reports summarizing which users accessed which files for which operations during what timeframes for subsequent audit or monitoring purposes.

In an embodiment, a sub-module may define a policy to collect tiered storage candidate information. Tiered storage or hierarchical storage management includes moving storage objects to different storage classes based upon frequency and/or recency of access. When this sub-module is enabled, the sub-module will collect access frequency metrics for files in a given file system over a repeating interval of time. In some embodiments, at the end of each interval, the sub-module stores the frequency measurements within a log file and begins collecting frequency measurements for the next interval. This information can later be used by an application that collects this data from sub-module, analyzes the collected metrics, and uses the results in applying the file migration model for tiered storage. For example, the top N most frequently accessed files for a given interval can be candidates for migration to faster storage, such as solid state disks, and files on the fastest storage that have not accessed during the interval can be candidates for migration to slower storage— for example, a Just a Bunch Of Disks (JBOD) drive, an optical drive, or a tape drive. In other embodiments, the sub-module may perform the analysis and use the information to migrate files to different storage tiers, rather than an application.

In an embodiment, a sub-module may define a policy that converts files from one format to another. For example, the format of files generated by different operating systems, such as Windows and Unix text files, may differ to some degree. In Windows, lines in text files end with both a line feed and a carriage return ASCII character, whereas UNIX text lines end with a line feed character only. As a consequence, some Windows applications will not show the line breaks in Unix-format files. Likewise, Unix applications may display the carriage returns in Windows text files with Ctrl-m (^M) characters at the end of each line. Thus, when a UNIX user accesses a Windows text file, the Windows text file will be automatically converted to a UNIX text file. Likewise, when a Windows user accesses a UNIX text file, the UNIX text file will be automatically converted to a Windows text file. In some embodiments, rather than converting the file in place, the sub-module may perform the conversion process transparently, thus allowing the application to view the file as though the file were converted, without modifying the original file. For example, an application may access the file through a Network Attached Storage (NAS) client. The sub-module may intercept the request to access the NAS and convert the file's data before returning the data to the calling application.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
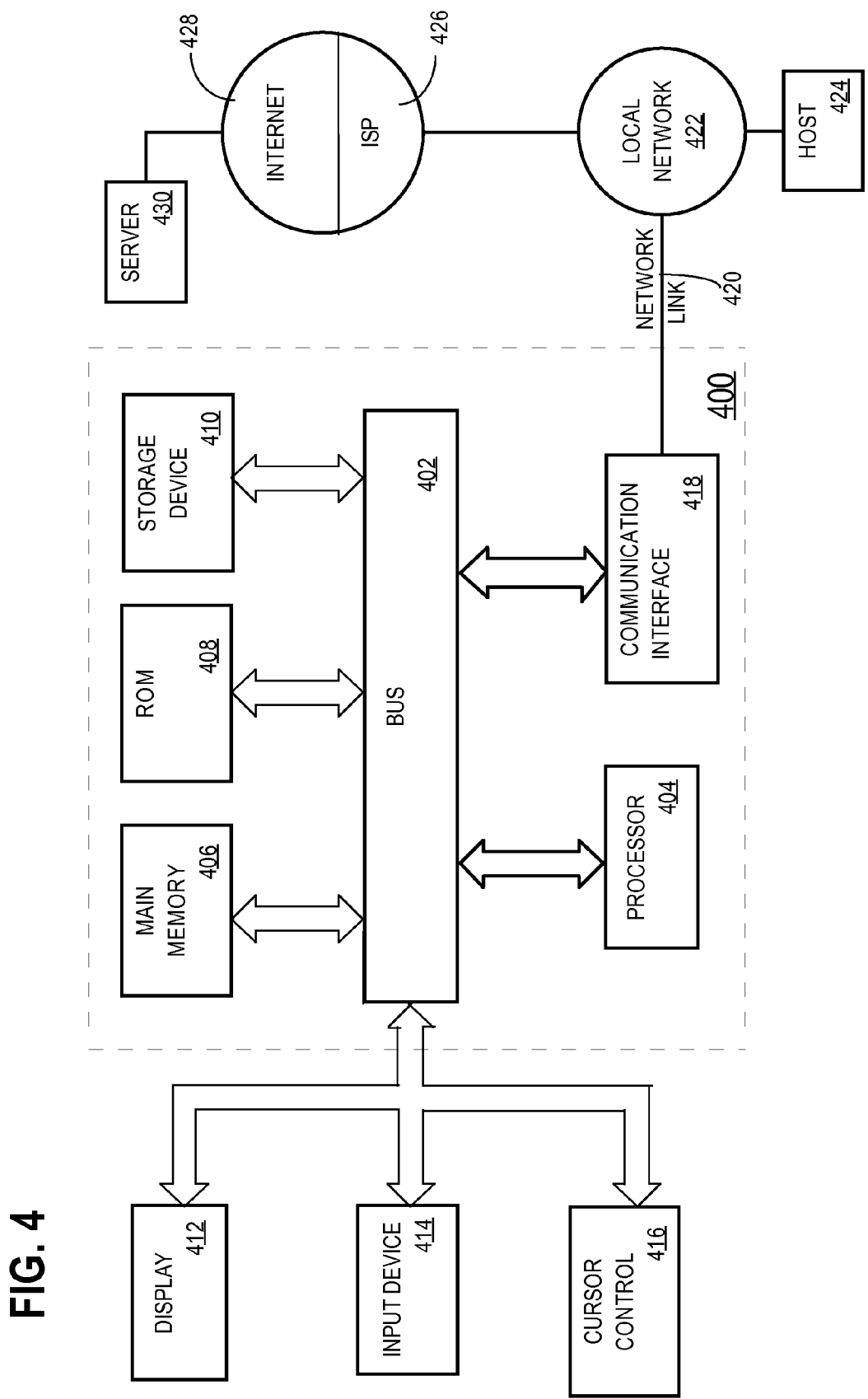
FIG. 4 is a block diagram that illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 440 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    executing, within a kernel of an operating system a kernel extension module representing a subsystem of the operating system;
    the kernel extension module maintaining a plurality of sub-modules wherein each sub-module of the plurality of sub-modules is configured to detect a respective one or more conditions and cause execution of a respective one or more corresponding actions when the one or more conditions are met;
    the kernel extension module receiving a command from an administrative configuration tool executing in user space which specifies to modify the respective one or more conditions of a particular sub-module of the plurality of sub-modules;
    the kernel extension module modifying the respective one or more conditions of the particular sub-module based on the command, wherein the modifying occurs while the kernel extension module is still executing within the kernel of the operating system;
    the kernel extension module receiving a request to perform a task on behalf of a first application, wherein the kernel extension module defines one or more default actions for the task that are different than the respective one or more corresponding actions of the particular sub-module;
    in response to a determination that the request meets the respective one or more conditions of the particular sub-module, the kernel extension module performing the respective one or more corresponding actions of the particular sub-module in addition to the default actions;
    wherein the respective corresponding actions of the particular sub-module involve collecting information related to performance of the one or more default actions by the subsystem;
    storing at least the information in a memory location that is accessible to a second application;
    wherein the method is performed by one or more computing devices.

2. The method of claim 1, wherein at least one sub-module is disabled and further comprising:
    receiving a command from the administrative configuration tool to enable a currently disabled sub-module;
    in response to receiving the command, enabling the currently disabled sub-module; determining whether the particular sub-module is enabled.

3. The method of claim 2, further comprising:
    receiving a second command from the administrative configuration tool to disable a currently enabled sub-module;
    in response to receiving the second command, disabling the currently enabled sub-module.

4. The method of claim 1, wherein the respective one or more conditions of the particular sub-module specify at least the first application.

5. The method of claim 1, wherein the subsystem is a virtual file system.

6. The method of claim 5, wherein the respective one or more conditions of the particular sub-module specify at least a particular file.

7. The method of claim 6, wherein the respective one or more conditions of the particular sub-module specify at least a particular identifier contained by the particular file.

8. The method of claim 6, wherein the information is file IO metrics.

9. The method of claim 6, wherein the respective one or more default actions of the particular sub-module modify the particular file and the information contains at least an indication of the modifications made to the particular file.

10. The method of claim 1, wherein the first application is executed by one or more processes and the one or more processes belong to an application group containing a plurality of processes.

11. The method of claim 10, wherein the respective one or more conditions of the particular sub-module specify at least the application group.

12. The method of claim 1, further comprising:
    receiving, from the second application, a request to retrieve the information;
    wherein storing at least the information in a memory location that is accessible to the second application occurs in response to receiving the request to retrieve the information.

13. A non-transitory computer-readable medium storing instructions which, when executed by one or more processors, cause the one or more processors to perform:
    executing, within a kernel of an operating system a kernel extension module representing a subsystem of the operating system;
    the kernel extension module maintaining a plurality of sub-modules wherein each sub-module of the plurality of sub-modules is configured to detect a respective one or more conditions and cause execution of a respective one or more corresponding actions when the one or more conditions are met;
    the kernel extension module receiving a command from an administrative configuration tool executing in user space which specifies to modify the respective one or more conditions of a particular sub-module of the plurality of sub-modules;
    the kernel extension module modifying the respective one or more conditions of the particular sub-module based on the command, wherein the modifying occurs while the kernel extension module is still executing within the kernel of the operating system;
    the kernel extension module receiving a request to perform a task on behalf of a first application, wherein the kernel extension module defines one or more default actions for the task that are different than the respective one or more corresponding actions of the particular sub-module;
    in response to a determination that the request meets the respective one or more conditions of the particular sub-module, the kernel extension module performing the respective one or more corresponding actions of the particular sub-module in addition to the default actions;

wherein the respective corresponding actions of the particular sub-module involve collecting information related to performance of the one or more default actions by the subsystem;

storing at least the information in a memory location that is accessible to a second application.

14. The non-transitory computer readable medium of claim 13, wherein at least one sub-module is disabled and the instructions cause the one or more processors to further perform:

receiving a command from the administrative configuration tool to enable a currently disabled sub-module;

in response to receiving the command, enabling the currently disabled sub-module; determining whether the particular sub-module is enabled.

15. The non-transitory computer readable medium of claim 14, wherein the instructions cause the one or more processors to further perform:

receiving a second command from the administrative configuration tool to disable a currently enabled sub-module;

in response to receiving the second command, disabling the currently enabled sub-module.

16. The non-transitory computer readable medium of claim 13, wherein the respective one or more conditions of the particular sub-module specify at least the first application.

17. The non-transitory computer readable of claim 13, wherein the subsystem is a virtual file system.

18. The non-transitory computer readable medium of claim 17, wherein the respective one or more conditions of the particular sub-module specify at least a particular file.

19. The non-transitory computer readable medium of claim 18, wherein the respective one or more conditions of the particular sub-module specify at least a particular identifier contained by the particular file.

20. The non-transitory computer readable medium of claim 18, wherein the information is file IO metrics.

21. The non-transitory computer readable medium of claim 18, wherein the respective one or more default actions of the particular sub-module modify the particular file and the information contains at least an indication of the modifications made to the particular file.

22. The non-transitory computer readable medium of claim 13, wherein the first application is executed by one or more processes and the one or more processes belong to an application group containing a plurality of processes.

23. The non-transitory computer readable medium of claim 22, wherein the respective one or more conditions of the particular sub-module specify at least the application group.

24. The non-transitory computer readable medium of claim 13, wherein the instructions cause the one or more processors to further perform:

receiving, from the second application, a request to retrieve the information;

wherein storing at least the information in a memory location that is accessible to the second application occurs in response to receiving the request to retrieve the information.

* * * * *

UNITED STATES PATENT AND TRADEMARK OFFICE
CERTIFICATE OF CORRECTION

PATENT NO.        : 8,839,272 B2
APPLICATION NO.   : 13/450396
DATED             : September 16, 2014
INVENTOR(S)       : Glover et al.

Page 1 of 1

It is certified that error appears in the above-identified patent and that said Letters Patent is hereby corrected as shown below:

On the Title Page, Item (56) Other Publications, line 1, delete ""Tunning" and insert -- "Tuning --, therefor.

In the Specification

In column 1, line 62, delete "that that" and insert -- that --, therefor.

In column 5, line 17, delete "FreeBDS" and insert -- FreeBSD --, therefor.

In the Claims

In column 17, line 26, in Claim 17, delete "of" and insert -- medium of --, therefor.

Signed and Sealed this
Tenth Day of March, 2015

Michelle K. Lee
*Deputy Director of the United States Patent and Trademark Office*